UNITED STATES PATENT OFFICE.

HAROLD ASHTON RICHARDSON, OF LONDON, ENGLAND.

CEMENT STEEL PLATE.

1,017,914.     Specification of Letters Patent.     Patented Feb. 20, 1912.

No Drawing.     Application filed October 15, 1910. Serial No. 587,342.

*To all whom it may concern:*

Be it known that I, HAROLD ASHTON RICHARDSON, a subject of the King of Great Britain and Ireland, and residing at Hyde Park Hotel, Knightsbridge, London, S. W., England, have invented certain new and useful Cement Steel Plates, of which the following is a specification.

This invention relates to improved cement steel or like plates or articles having a glass hard surface designed for armor plates, and other purposes for which plates hardened on one surface, are required. In known processes for the manufacture of such plates, a mild steel containing 0.3 per cent. of carbon is subjected to a cementation process, the plates being placed in a furnace and covered with carbon on one side, and then heated for seven or eight days at a red heat. The plates are then quenched in water, which hardens the portion of the steel which has been carburized. In some cases the steel before hardening has been heated to a red heat and plunged in water, and then again heated to a somewhat lower heat, and again plunged in water to give the plate a fibrous structure, the fibrous plate being then hardened by subjecting the surface which requires hardening to a higher temperature, and quenching.

The object of the present invention is to provide an improved steel plate or like article having a hardened surface, and the invention includes a plate having the novel composition hereinafter described and particularly defined by the appended claims.

In carrying the invention into effect according to one modification I prepare an alloy containing tungsten 2½ per cent., nickel 4 per cent., and carbon 0.3 per cent., by any open hearth process, by which a pure steel free from phosphorus and sulfur can be obtained. If a mixture of molybdenum and tungsten is used the equivalent quantity of the mixture should be taken and for this purpose 1 per cent. of molybdenum is equivalent to about 2½ per cent. of tungsten. For the purpose of the manufacture of armor plates the ingots of this composition are rolled to the desired thickness of plate, and the plates covered with oak charcoal or other carbon on one surface, and heated for from seven to eight days at a red heat, as is usual in the cementation process. Other articles can be formed and their surfaces treated in a similar manner.

By the above treatment a plate having a glass hard surface is obtained without quenching. I also find that all or part of the nickel may be replaced by cobalt.

It will be seen that in the above process the hardened plate or other article is obtained without the necessity for heating different portions thereof to different temperatures.

Having now described my invention what I claim as new and desire to secure by Letters Patent is:—

1. Cement steel plates or other articles having a glass-hard surface containing tungsten about 2½ per cent. throughout the plate or article, carbon 0.2 to 0.5 per cent, through the back portion of the plate or article and a further proportion of carbon in the face of the plate or article, as set forth.

2. Cement steel plates or other articles having a glass-hard surface containing about 2½ per cent. of tungsten, 4 per cent. of nickel and 0.3 per cent. of carbon throughout the back portion of the plate or article and an additional proportion of carbon in the face of the plate or article.

3. Cement steel plates or other articles having a glass-hard surface containing both molybdenum and tungsten in quantity equivalent to about 2½ per cent. of tungsten, carbon 0.2 to 0.5 per cent. through the back portion of the plate or article and a further proportion of carbon in the face of the plate or article.

4. Cement steel plates or other articles having a glass-hard surface containing both molybdenum and tungsten in quantity equivalent to about 2½ per cent. of tungsten, 4 per cent. of nickel and 0.3 per cent. of carbon throughout the back portion of the plate or article and an additional proportion of carbon in the face of the plate or article, as set forth.

In testimony whereof I affix my signature in presence of two witnesses.

HAROLD ASHTON RICHARDSON.

Witnesses:
   ALFRED N. GARDNER,
   E. C. WALKER.